M. T. CHAPMAN.
PUMPING APPARATUS.
APPLICATION FILED MAY 23, 1912. RENEWED JAN. 28, 1916.
1,179,346.
Patented Apr. 11, 1916.
4 SHEETS—SHEET 2.
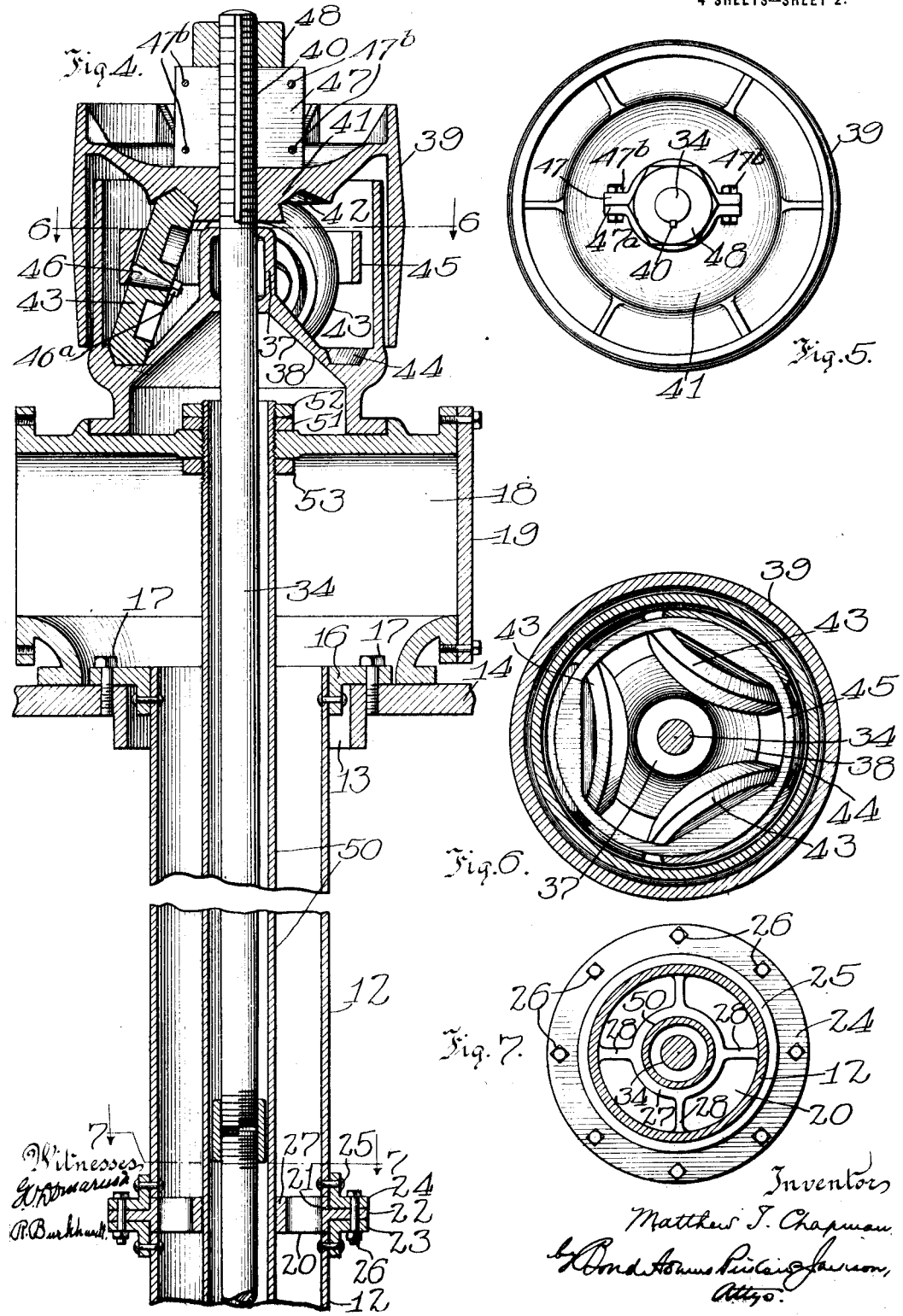

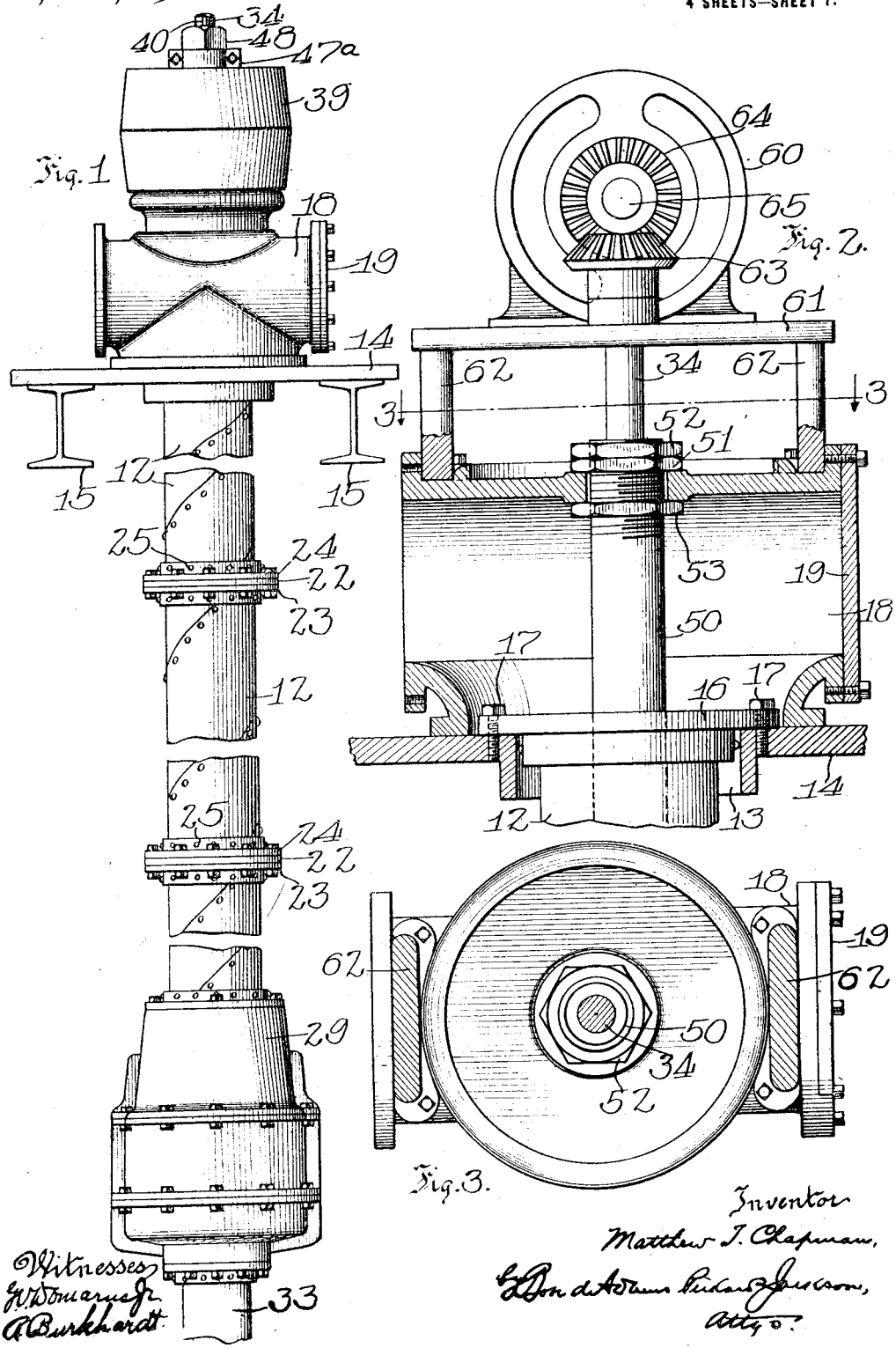

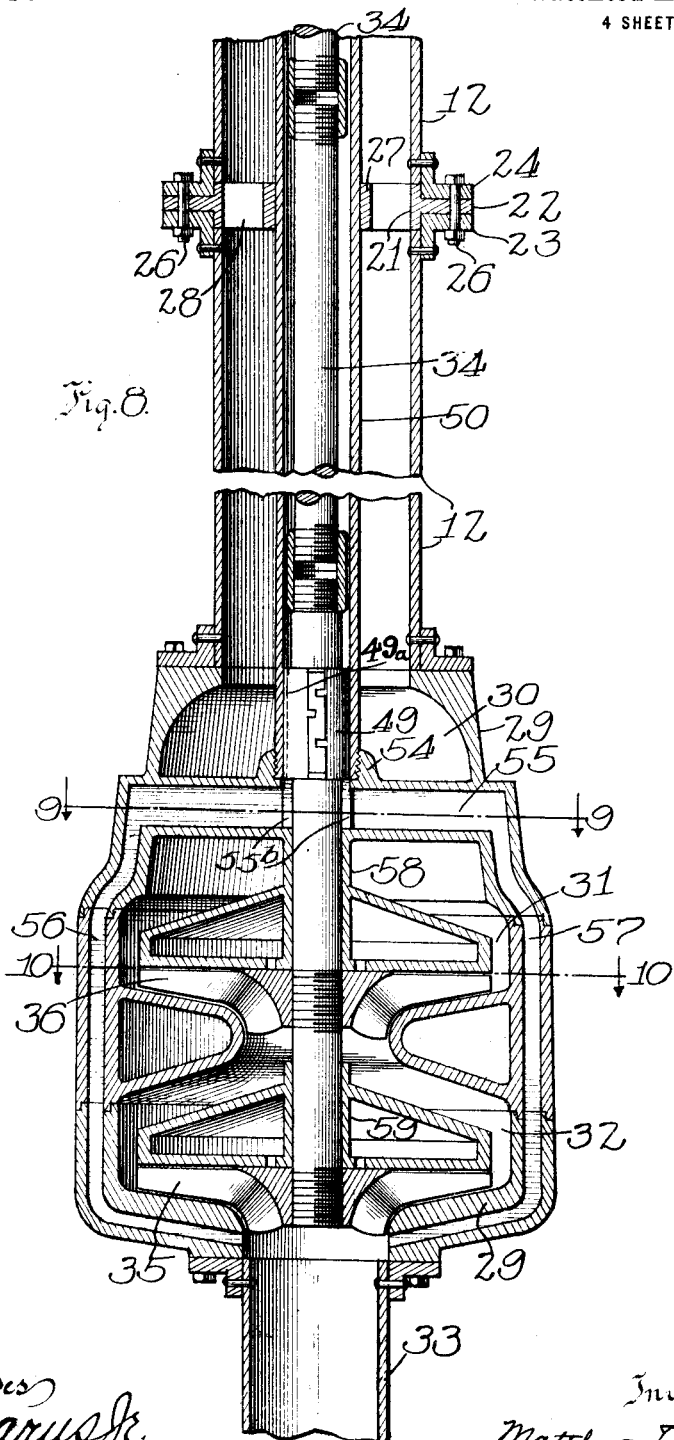

M. T. CHAPMAN.
PUMPING APPARATUS.
APPLICATION FILED MAY 23, 1912. RENEWED JAN. 28, 1916.
1,179,346.
Patented Apr. 11, 1916.
4 SHEETS—SHEET 4.
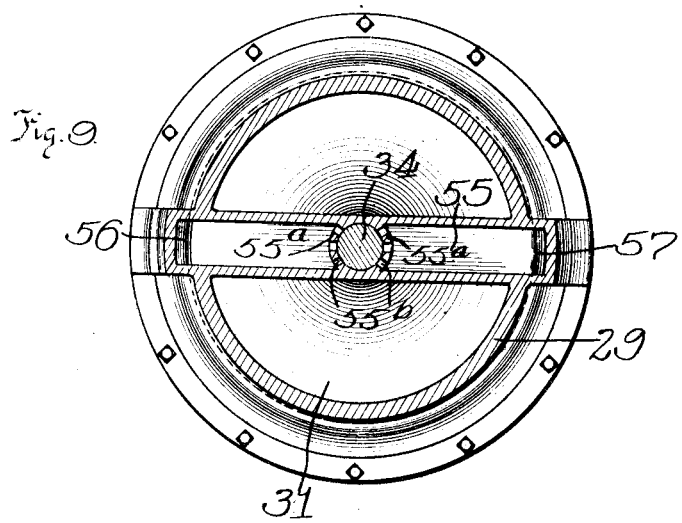
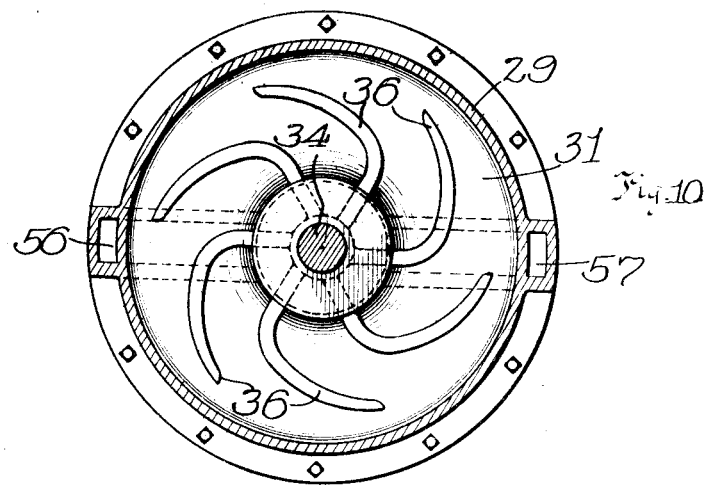
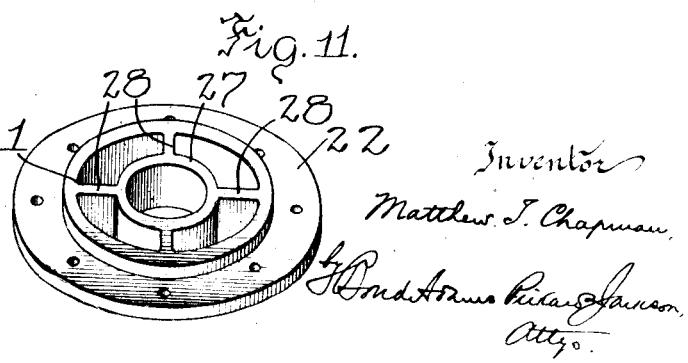

UNITED STATES PATENT OFFICE.

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

PUMPING APPARATUS.

1,179,346.  Specification of Letters Patent.  Patented Apr. 11, 1916.

Application filed May 23, 1912, Serial No. 699,176. Renewed January 28, 1916. Serial No. 74,859.

*To all whom it may concern:*

Be it known that I, MATTHEW T. CHAPMAN, a citizen of the United States, residing at Aurora, in the county of Kane and State of Illinois, have invented certain new and useful Improvements in Pumping Apparatus, of which the following is a specification, reference being had to the accompanying drawings.

My invention relates to pumping machinery, and has more particularly to do with centrifugal pumps used for elevating water for irrigation and other purposes.

It has for its objects to provide improved means for preventing the admission of sand, grit, and other injurious substances to the pump-shaft bearings; to provide improved means for supporting the pump-shaft, and the casing through which the shaft passes; to provide improved means for connecting the sections of the well-tube; and to provide certain other improvements which will be hereinafter pointed out. I accomplish these objects as hereinafter described and as illustrated in the drawings. What I regard as new is set forth in the claims.

In the accompanying drawings,—Figure 1 is a side elevation, partly broken away, illustrating a well-tube, the housing for the pump runners, and the driving pulley; Fig. 2 is an enlarged detail, being a side elevation, partly in section, showing a modified driving device; Fig. 3 is a horizontal section on line 3—3 of Fig. 2; Fig. 4 is an enlarged vertical section, partly broken away, illustrating the upper portion of the well-tube and connected parts; Fig. 5 is a plan view of the parts shown in Fig. 4; Fig. 6 is a horizontal section on line 6—6 of Fig. 4; Fig. 7 is a horizontal section on line 7—7 of Fig. 4; Fig. 8 is a vertical section, being a continuation downward of the view shown in Fig. 4; Fig. 9 is a horizontal section on line 9—9 of Fig. 8; Fig. 10 is a horizontal section on line 10—10 of Fig. 8; and Fig. 11 is a perspective view of one of the coupling members by which adjoining sections of the well-tube are connected together.

Referring to the drawings,—12 indicates a well-tube, which is designed to be let down into the well and forms a conduit through which the water lifted passes up to the point of discharge. In Fig. 1 I have illustrated the well-tube as being composed of spiral riveted pipe, and the coupling members illustrated, by which adjoining sections of the pipe are secured together, are designed especially for use with pipe of that kind, but they may be also used with pipe of other construction, and my invention in other respects is not limited to using such spiral pipe. As shown in Fig. 4, the upper end of the well-tube 12 projects through an opening 13 in a bed-plate 14 which is provided at the surface of the ground and preferably rests on I-beams 15.

16 indicates an annular cover-plate, which fits around and is secured to the upper end of the well-tube 12 and is secured to the bed-plate 14, preferably by bolts 17.

18 indicates an outlet conduit which rests on the bed-plate 14 and extends horizontally over the cover-plate 16 and communicates with the upper end of the well-tube, as shown. Preferably one end of the outlet 18 is closed by a plate 19, the other end being open for the discharge of the water or other liquid pumped. By removing the plate 19 and applying it to the opposite end of the conduit 18, the direction of discharge may be reversed.

As best shown in Figs. 1 and 4, the well-tube 12 is made up of a number of sections joined together, and for the purpose of providing a continuous pipe having a smooth and uninterrupted inner surface and to provide a proper lateral support for the pump-shaft casing hereinafter described, I employ coupling-rings 20 which are adapted to fit between adjoining sections of the well-tube as shown at 21 in Fig. 4. The spiral riveted pipe referred to is usually not made true at the ends, and it is therefore difficult to properly connect sections of it together. I am able, however, to secure a proper union of the pipe sections by facing off the ends of the sections so that they are true and similarly facing off the registering portion of the coupling 20 so that when the parts are fitted together they will fit closely and be in alinement, as shown in Fig. 4. The coupling member 20 is provided with a radially-projecting flange 22 which fits between angle-rings 23 and 24 which are secured to the end portions of the pipe sections 12 and overlie the vertical portions of the coupling member 20 and also abut against the flange 22 thereof. The rings 23—24 are secured to the well-tube sections preferably by rivets 25 and said rings and the flange 22 are secured together by bolts 26, thus firmly uniting the parts together. The coupling member 20 is also provided with a central ring 27 which centers the pump-shaft casing, as hereinafter described, said ring being connected with the outer portion of the coupling member by radial arms 28, as shown in Fig. 7.

29 indicates a housing for the pump runners, which is connected with the lower end of the well-tube 12, as shown in Figs. 1 and 8. Within said housing is an upper chamber 30 which communicates with the well-tube 12 and with chambers 31—32 in which the pump runners operate. At its lower end the housing 30 communicates with the well through an inlet pipe 33, as shown in Fig. 8.

34 indicates the pump-shaft, which extends down through the well-tube 12 and through the housing 29, as shown in Fig. 8. The shaft 34 carries runners 35—36, in any desired number, said runners being secured thereon so as to rotate therewith, the arrangement being such that by rotating said shaft the water is forced up through the several chambers of the housing 29 and up through the well-tube 12 to the outlet. As best shown in Fig. 4, the pump-shaft 34 extends up through the conduit 18 and through a bearing 37 having a conical member 38 which rests upon the upper surface of the conduit 18 and is secured thereto in any suitable way. The shaft 34, with the runners carried by it, is suspended in the well-tube by means of a pulley 39 which also provides for its rotation. This pulley is non-rotatably connected with the pump-shaft by a feather 40, so as to permit longitudinal adjustment of the shaft, and is further secured thereto by a clamp hereinafter described. The pulley 39 is provided with a hub 41 having an inverted angular race 42, shown in Fig. 4, which rests upon the peripheries of angular anti-friction rollers 43, the latter resting in an angular race 44 provided in the member 38. The several anti-friction rollers 43 are spaced apart and held against outward thrust by a ring 45, being mounted on inwardly-projecting journals 46 carried by said ring, as shown in Fig. 4. Preferably, nuts 46ª are provided on the inner ends of the journals. Said anti-friction rollers are inclined together at the top, as shown, so that they hold the pulley in a central position and serve to center the pump-shaft 34.

47 indicates the fixed member of a clamp, which is formed integral with the hub of the pulley 39 and fits upon the upper end of the pump-shaft 34.

47ª indicates a separable clamp member which coöperates with the member 47 to clamp the shaft 34, the two members being secured together by bolts 47ᵇ.

48 indicates an adjusting nut secured upon the upper end of the shaft for vertically adjusting the same. By this construction the shaft 34 is suspended from its upper end and consequently gravity tends to preserve its vertical alinement. It is properly centered by the bearing 37 and by a second bearing 49 provided in the upper portion of the housing 29, as shown in Fig. 8. The latter bearing is preferably a split-bearing and fits in the lower end of a casing 50 which is also suspended from its upper end and surrounds and incloses the pump-shaft, extending from the chamber 30 of the housing 29 up to and through the outlet conduit 18 from which it is suspended, as shown in Fig. 4. At its upper end the casing 50 is secured and suspended by means of nuts 51, 52 and 53 screwed upon it outside and inside of the outlet conduit 18, as shown. It also passes through the several rings 27 and is centered by them so that it is held properly in position at all times. The purpose of the casing 50 is to protect the pump-shaft from sand or other gritty matter contained or carried in the water pumped and also to provide means for lubricating the pump-shaft, the lubricant being introduced at the upper end of the casing in any suitable way.

In order to prevent the admission of sand, etc., to the casing 50 at its lower end the casing at that point is fitted into a suitable recess formed by an annular boss 54 formed upon a transverse conduit 55 which extends across the chamber 30, and is provided with a central ring 55ª having openings 55ᵇ leading to the shaft 34, as shown in Figs. 8 and 9. The conduit 55 communicates at its ends with ducts 56—57 extending down and outside of the chambers 31—32 and communicating with the inlet 33 below the lowermost pump-runner 35. These ducts are best cast integral with the members of the housing, which is preferably made of sections suitably joined together. The bearing 49 shown in Fig. 8 is fitted in the lower end of the casing 50 and supports the pump-shaft at that point.

58—59 indicate bearings for the shaft above the runners 36—35, respectively.

The purpose of the transverse conduit 55 is to intercept any sand or other gritty matter passing up through the bearing 58 and direct it back to the inlet through the ducts 56—57 and thereby prevent it from passing up into the bearing 49 and into the casing 50, where it would remain and soon destroy the bearings within said casing. Furthermore, any oil leaking down around the bearing 49 passes into the conduit 55 and helps to remove from said bearing any particles of gritty matter which may have gained access thereto, thus further protecting the bearing from wear. Preferably, the members of the bearing 49 are provided with longitudinal channels 49ª, indicated in dotted lines in Fig. 8, for supplying lubricant thereto.

In Figs. 2 and 3 I have shown a modified construction, in which instead of driving the pump-shaft 34 by means of a pulley, I employ a motor 60 mounted on a base-plate 61 carried by pedestals 62 rising from the outlet conduit 18. With this construction the pump-shaft 34 may be provided at its upper end with a beveled gear 63 meshing with a beveled gear 64 on the shaft 65 of the motor, but any other suitable driving connection may be employed.

By reason of almost but not quite completely closing the lower end of the casing 50 about the shaft 34 by means of the open unpacked bearing 49 only, without the use of any packing either in the bearing itself or at any other point between the interior of the casing and the transverse passageway 55, I have provided for a restricted flow of lubricant from the interior of the casing through the bearing. By reason of providing open communication between the lower end of the bearing 49 and the suction side of the pumping mechanism through the openings 55ᵇ, the transverse passageway 55, and the downwardly-extending passageways 56—57, I have provided for a constant downward suction effective upon the lower end of the casing 50 through the bearing 49. By making the transverse passageway 55 and the downwardly-extending ducts 56—57 continuous and unbroken without any openings along their walls between the openings 55ᵇ at the shaft and the terminal openings below the runner 35, I have provided that the downward suction through such passageways shall be continuous and effective for the purposes specified.

That which I claim as my invention, and desire to secure by Letters Patent, is,—

1. In a pumping apparatus, the combination of a well-tube, a housing connected to and communicating with the lower end portion of the well-tube, a pump-shaft extending down through said well-tube and into the housing, pumping means carried by said shaft, a transverse conduit extending across said housing and opening upon said shaft above said pumping means, an inlet communicating with the lower portion of said housing, and one or more ducts leading from said conduit down to said inlet whereby a downward suction is exerted through said ducts.

2. In a pumping apparatus, the combination of a well-tube, a housing connected to and communicating with the lower end portion of the well-tube, a pump-shaft extending down through said well-tube and into the housing, pumping means carried by said shaft, a transverse conduit extending across said housing and opening upon said shaft, an inlet communicating with the lower portion of said housing, one or more ducts leading from said conduit down to said inlet whereby a downward suction is exerted through said ducts, a casing surrounding the pump-shaft and extending upward through the well-tube from said transverse conduit, and a bearing for said shaft above and adjacent to said transverse conduit.

3. In a pumping apparatus, the combination of a well-tube, an outlet conduit communicating with the upper end portion thereof, a pump-shaft extending down through said well-tube, a casing surrounding said shaft and extending up through said outlet conduit, pumping devices carried by the lower end portion of said shaft, and means above said outlet conduit for supporting said shaft comprising a pulley having a hub provided with an inverted race, a suitable member having a coöperating race, inclined anti-friction rollers operating in said races, said rollers having angular peripheries, and means for supporting the pump-shaft from said pulley.

4. In a pumping apparatus, the combination of a well-tube, an outlet conduit communicating with the upper end portion thereof, a pump-shaft extending down through said well-tube, a casing surrounding said shaft and extending up through said outlet conduit, pumping devices carried by the lower end portion of said shaft, and means above said outlet conduit for supporting said shaft comprising a pulley having a hub provided with an inverted race, a suitable member having a coöperating race, inclined anti-friction rollers operating in said races, said rollers having angular peripheries, a clamp secured to the pump-shaft above said hub, and a nut screwed upon said shaft above the clamp.

5. In a pumping apparatus, the combination of a well-tube, a housing connected to and communicating with the lower end portion of the well-tube, a pump-shaft extending down through said well-tube and into the housing, pumping means carried by said shaft, a transverse conduit extending through said housing and having openings leading to the pump-shaft, an inlet communicating with the lower portion of said housing, and one or more ducts leading from said conduit down to said inlet whereby a downward suction is exerted through said ducts.

6. In a pumping apparatus, the combination of a well-tube, a pump-shaft extending down through said well-tube, rotary pumping means adapted to be rotated by said pump-shaft for raising water through said well-tube, a cross-head fixed on said shaft having an annular groove on its lower face, a second cross-head loosely mounted on said shaft below said first-named cross-head and having an annular groove of a different circumferential length on its upper face, and inclined rollers interposed between said cross-heads for supporting said shaft.

7. In a pumping apparatus, the combination of a well-tube, a pump-shaft extending down through said well-tube, rotary pumping means adapted to be rotated by said pump-shaft for raising water through said well-tube, a cross-head fixed on said shaft having an annular groove on its lower face, a second cross-head loosely mounted on said shaft below said first-named cross-head and having an annular groove of a different circumferential length on its upper face, inclined rollers interposed between said cross-head for supporting said shaft, and means for holding said rollers in spaced relation relative to each other about said shaft.

8. In a pumping apparatus, the combination of a well-tube, a pump-shaft extending down through said well-tube, rotary pumping means adapted to be rotated by said pump-shaft for raising water through said well-tube, a cross-head fixed on said shaft having an annular groove on its lower face, a second cross-head loosely mounted on said shaft below said first-named cross-head and having an annular groove of a different circumferential length on its upper face, inclined rollers interposed between said cross-heads for supporting said shaft, and a ring extending around said rollers and having inwardly-projecting journals upon which said rollers are mounted for holding said rollers in spaced relation relative to each other about said shaft.

9. In a pumping apparatus, the combination of a well-tube, a pump-shaft extending down through said well-tube, rotary pumping means adapted to be rotated by said pump-shaft for raising water through said well-tube, inclined rollers supporting said pump-shaft, and means for holding said rollers properly positioned relative to each other comprising a ring extending around said rollers and inwardly-tapered pins mounted in said ring projecting toward said shaft, upon which pins said rollers are revolubly mounted.

10. In a rotary pump, the combination of a pump-shaft extending down into a well, means for driving said shaft, a bearing above said pumping mechanism serving to hold said shaft in operative position, and pumping mechanism below said bearing adapted to force water upward past the bearing on its outer face and also adapted to exert a continuous suction downward through said bearing.

11. In a rotary pump, the combination of a pump-shaft extending down into a well, means for driving said shaft, a casing inclosing said shaft below said driving means, means almost but not quite completely closing the lower end of said casing about said shaft but permitting a restricted flow from said casing, and pumping mechanism adapted to exert a continuous downward suction upon said casing.

12. In a rotary pump, the combination of a pump-shaft extending down into a well, means for driving said shaft, a casing inclosing said shaft below said driving means, a bearing almost but not quite completely closing the lower end of said casing about said shaft but permitting a restricted flow therethrough from the casing, and pumping mechanism adapted to exert a continuous downward suction upon said casing through said bearing.

13. In a rotary pump, the combination of a pump-shaft extending down into a well, means for driving said shaft, a bearing above said pumping mechanism serving to hold said shaft in operative position, a casing inclosing said shaft above said bearing and communicating at its lower end with said bearing, and pumping mechanism below said bearing adapted to force water upward along the outer face of the shaft casing and also adapted by open communication with said bearing to exert a continuous downward suction through said casing.

14. In a rotary pump, the combination of a pump-shaft extending down into a well, means for driving said shaft, pumping mechanism operatively connected with said shaft near its lower end, and a bearing for said shaft above said pumping mechanism, communication being normally open during the operation of the pump from the bearing to the suction side of said pumping mechanism.

15. In a rotary pump, the combination of a pump-shaft extending down into a well, means for driving said shaft, pumping mechanism operatively connected with said shaft near its lower end, a bearing for said shaft above said pumping mechanism, and a continuous unbroken passageway leading from the lower end of said bearing to the suction side of said pumping mechanism.

16. In a rotary pump, the combination of a pump-shaft extending down into a well, means for driving said shaft, pumping mechanism operatively connected with said shaft near its lower end, a bearing for said shaft above said pumping mechanism, and a passageway leading from the lower end of said bearing, extending downward around said pumping mechanism, and opening into the water passage on the suction side of said pumping mechanism.

17. In a rotary pump, the combination of a pump-shaft extending down into a well, means for driving said shaft, pumping mechanism operatively connected with said shaft near its lower end, a bearing for said shaft above said pumping mechanism, an opening to said shaft between said bearing and said pumping mechanism, and a passageway leading from said opening, extending downward around said pumping mechanism, and opening into the water passage below said pumping mechanism.

18. In a rotary pump, the combination of a pump-shaft extending down into a well, means for driving said shaft, a casing inclosing said shaft below said driving means, pumping mechanism operatively connected with said shaft near its lower end, and a passageway leading from the lower end of said casing, extending downward around said pumping mechanism, and opening into the water passage below said pumping mechanism, said pumping mechanism being adapted to exert a downward suction upon said casing through said passageway.

19. In a rotary pump, the combination of a pump-shaft extending down into a well, means for driving said shaft, pumping mechanism operatively connected with said shaft near its lower end, a casing inclosing said shaft above said pumping mechanism, closure means almost but not quite completely closing the lower end of said casing about said shaft, and a passageway leading from the interior of the casing to the suction side of the pumping mechanism comprising a longitudinal channel in said closure means.

20. In a rotary pump, the combination of a pump-shaft extending down into a well, means for driving said shaft, pumping mechanism operatively connected with said shaft near its lower end, a bearing for said shaft above said pumping mechanism, and a passageway comprising a longitudinal channel provided by said bearing leading to the suction side of said pumping mechanism.

21. In a rotary pump, the combination of a pump-shaft extending down into a well, means for driving said shaft, pumping mechanism operatively connected with said shaft near its lower end, a casing inclosing said shaft above said pumping mechanism, closure means comprising a bearing almost but not quite completely closing the lower end of said casing about said shaft, and a passageway leading from the interior of the casing to the suction side of the pumping mechanism comprising a longitudinal channel in said bearing along said shaft.

22. In a rotary pump, the combination of a pump shaft extending down into the well, means for driving said shaft, a casing inclosing said shaft, a bearing communicating with said casing serving to hold said shaft in operative position, and a pumping mechanism below said bearing adapted to force water upward past the bearing on its outer face and also adapted to conduct lubricant from the shaft protecting casing to the pump to be pumped with the water from the well.

23. In a rotary pump, the combination of a pump shaft extending down into the well, means for driving said shaft, a casing inclosing said shaft, a bearing communicating with said casing serving to hold said shaft in operative position, and a pumping mechanism below said bearing adapted to force water upward past the bearing on its outer face and also adapted to conduct the liquid from the interior of the casing to the pump.

24. In a rotary pump, the combination of a pump shaft extending down into a well, means for driving said shaft, a bearing serving to hold said shaft in operative position, a pumping mechanism below said bearing adapted to force water upward past the bearing on its outer face, and means adapted to conduct the used lubricant downward by said bearing to the pump.

25. In a rotary pump, the combination of a pump shaft extending down into a well, means for driving said shaft, a bearing serving to hold said shaft in operative position, a pumping mechanism below said bearing adapted to force water upward past the bearing on its outer face, and means adapted to conduct the used lubricant downward by said bearing to the pump where it is pumped with the water from the well through the discharge of the pump.

26. In a rotary pump, the combination of a pump shaft extending down into a well, means for driving said shaft, pumping mechanism operatively connected with said shaft near its lower end, a bearing for said shaft above said pumping mechanism, a casing communicating at its lower end with said bearing, and connections through said bearing between said casing and the suction side of said pumping mechanism whereby a downward suction is exerted through said casing.

27. In a rotary pump, the combination of a pump shaft extending down into a well, means for driving said shaft, pumping mechanism operatively connected with said shaft near its lower end, a shaft-casing inclosing said shaft above said pumping mechanism, and connections between the lower end of said shaft-casing and the suction side of said pumping mechanism whereby a downward suction is exerted upon said shaft-casing.

28. In a rotary pump, the combination of a pump shaft extending down into a well, means for driving said shaft, pumping mechanism operatively connected with said shaft near its lower end, a continuous shaft-casing inclosing said shaft substantially from said driving means to said pumping mechanism, and connections betweeen the lower end of said casing and the suction side of said pumping mechanism whereby a downward suction is exerted upon said shaft-casing.

29. In a rotary pump, the combination of a pump shaft extending down into a well, means for driving said shaft, pumping mechanism operatively connected with said shaft near its lower end, a shaft-casing including said shaft above said pumping mechanism, a bearing for said shaft above said pumping mechanism communicating at its upper end with said casing, and connections between said shaft-casing through said bearing and the suction side of said pumping mechanism whereby a downward suction is exerted upon said shaft-casing.

30. In a rotary pump, the combination of a pump shaft suspended from its upper end and extending downward into a well, means for driving said shaft, rotary pumping mechanism operatively connected with the lower end of said shaft, a shaft-casing suspended from its upper end and inclosing said shaft substantially from the driving means to the pumping mechanism, and connections between the lower end of said shaft-casing and the suction side of said pumping mechanism whereby a downward suction is exerted upon said shaft-casing.

31. In a rotary pump, the combination of a pump shaft adjustably suspended from its upper end and extending downward into a well, means for driving said shaft, rotary pumping mechanism operatively connected with the lower end of said shaft, a shaft-casing adjustably suspended from its upper end and inclosing said shaft substantially from the driving means to the pumping mechanism, and connections between the lower end of said shaft-casing and the suction side of said pumping mechanism whereby a downward suction is exerted upon said shaft-casing, said shaft and said shaft-casing being adapted to be adjusted vertically relative to each other for shifting the aggregate weight of the two as desired to either of them.

32. In a rotary pump, the combination of a pump shaft suspended from its upper end and extending downward into a well, means for driving said shaft, rotary pumping mechanism operatively connected with the lower end of said shaft, a shaft-casing suspended from its upper end and inclosing said shaft substantially from the driving means to the pumping mechanism, said shaft-casing being provided with only one bearing for said shaft, such bearing being located near the lower end of the shaft, and connections between the lower end of said shaft-casing below said bearing and the suction side of the pumping mechanism whereby a downward suction is exerted upon said shaft-casing.

33. In a pump, the combination with a suspended shaft having a screw-thread about its upper end and provided with a longitudinally-extending keyway, a nut 48 adapted to be adjusted by means of said screw-thread upon said shaft, a key in said keyway for holding said nut in fixed position when adjusted, and means for supporting said nut whereby said shaft may be adjusted vertically, of an adjustably suspended casing inclosing said shaft, said shaft and said casing being both adapted to be adjusted for straightening them and holding them in tension, a channel 49$^a$ leading om the lower end of said casing, and a conduit 55 and ducts 56—57 communicating with said channel and leading to the suction side of the pump.

34. In a pump, the combination of a discharge-pipe, a pump shaft extending downward therein, a pump-casing secured to the lower end of said discharge-pipe, pumping mechanism in said pump-casing operatively connected with said shaft, a shaft-casing surrounding said shaft and held rigidly in position at its lower end relative to said discharge-pipe, means for adjusting the upper end of said shaft-casing vertically for giving said casing the desired tension relative to said discharge-pipe, means for adjusting the upper end of said shaft vertically for moving the pumping mechanism into the desired adjustment relative to the pump-casing, and a bearing carried by said shaft-casing for said shaft near the lower end of the shaft adjacent to the said pump-casing, said shaft-casing being provided with a passageway leading from its interior to the suction side of the pump whereby lubricant contained in the casing is drawn therefrom through said passageway.

MATTHEW T. CHAPMAN.

Witnesses:
  JOHN L. JACKSON,
  MINNIE A. HUNTER.

It is hereby certified that in Letters Patent No. 1,179,346, granted April 11, 1916, upon the application of Matthew T. Chapman, of Aurora, Illinois, for an improvement in "Pumping Apparatus," an error appears in the printed specification requiring correction as follows: Page 6, lines 4–5, claim 29, for the word "including" read *inclosing;* and that the said Letters Patent should be read with this correction therein that the same may conform to the record of the case in the Patent Office.

Signed and sealed this 23d day of May, A. D., 1916.

[SEAL.]

J. T. NEWTON,
*Acting Commissioner of Patents.*

Cl. 253—199.